United States Patent
Watanabe et al.

(10) Patent No.: US 12,415,283 B2
(45) Date of Patent: Sep. 16, 2025

(54) ROBOT MANIPULATION DEVICE AND ROBOT

(71) Applicant: FANUC CORPORATION, Yamanashi (JP)

(72) Inventors: Kazuhiro Watanabe, Yamanashi (JP); Tomoyuki Motokado, Yamanashi (JP); Toshihiko Inoue, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 46 days.

(21) Appl. No.: 18/277,940

(22) PCT Filed: Mar. 11, 2022

(86) PCT No.: PCT/JP2022/010766
§ 371 (c)(1),
(2) Date: Aug. 18, 2023

(87) PCT Pub. No.: WO2022/196543
PCT Pub. Date: Sep. 22, 2022

(65) Prior Publication Data
US 2024/0131722 A1    Apr. 25, 2024
US 2024/0227199 A9    Jul. 11, 2024

(30) Foreign Application Priority Data
Mar. 17, 2021    (JP) .................... 2021-043221

(51) Int. Cl.
B25J 13/02    (2006.01)
B25J 9/16    (2006.01)
(Continued)

(52) U.S. Cl.
CPC ...................... B25J 13/02 (2013.01)

(58) Field of Classification Search
CPC ........ B25J 13/02; B25J 9/1664; B25J 13/085; G05B 19/423; G05B 2219/39439
See application file for complete search history.

(56) References Cited

U.S. PATENT DOCUMENTS

2009/0259412 A1*  10/2009  Brogardh ............. G05B 19/423
                                                        702/41
2010/0312391 A1   12/2010  Choi et al.
(Continued)

FOREIGN PATENT DOCUMENTS

| JP | S60163108 A | 8/1985 |
| JP | H0816225 A | 1/1996 |

(Continued)

OTHER PUBLICATIONS

International Search Report and Written Opinion dated Mar. 31, 2022, for International Patent Application No. PCT/JP2022/010766.

*Primary Examiner* — Harry Y Oh
(74) *Attorney, Agent, or Firm* — KARCESKI IP LAW, PLLC

(57) ABSTRACT

An robot operation device attached to a robot having a long tool fixed to a flange provided at a distal end of the robot, the robot operation device includes a handle having an inner hole through which the tool is inserted, the handle configured to be held by one of hands of an operator in a manner that a longitudinal axis of the tool is enclosed by the one of the hands, and a sensor configured to attach the handle to the flange, the sensor detecting force or moment applied to the handle by the operator. The robot is operable by lead-through control which changes a position and posture of the robot in response to the force or the moment detected by the sensor.

9 Claims, 11 Drawing Sheets

(51) Int. Cl.
*B25J 13/08* (2006.01)
*G05B 19/423* (2006.01)

(56) References Cited

U.S. PATENT DOCUMENTS

| | | | |
|---|---|---|---|
| 2016/0288236 A1* | 10/2016 | Becker | B23K 9/0953 |
| 2019/0099898 A1* | 4/2019 | Sato | B25J 15/0683 |
| 2024/0335939 A1* | 10/2024 | Akey | B25J 9/0009 |

FOREIGN PATENT DOCUMENTS

| | | | |
|---|---|---|---|
| JP | 2005293098 A | | 10/2005 |
| JP | 2015199174 A | | 11/2015 |
| JP | 2017064878 A | | 4/2017 |
| JP | 2018034224 A | | 3/2018 |
| JP | 2018176288 A | | 11/2018 |
| JP | 2019034412 A | | 3/2019 |
| JP | 2019063916 A | | 4/2019 |
| JP | 2019202372 A | | 11/2019 |
| KR | 20120038641 A | * | 4/2012 |
| KR | 1020120038641 A | | 4/2012 |
| KR | 1020180110820 A | | 10/2018 |

* cited by examiner

ROBOT MANIPULATION DEVICE AND ROBOT

CROSS-REFERENCE TO RELATED APPLICATION(S)

This is a National Stage Entry into the United States Patent and Trademark Office from International Patent Application No. PCT/JP2022/010766, filed on Mar. 11, 2022, which relies on and claims priority to Japanese Patent Application No. 2021-043221, filed on Mar. 17, 2021, the entire contents of both of which are incorporated herein by reference.

FIELD OF THE INVENTION

The present disclosure relates to a robot operation device and a robot.

BACKGROUND OF THE INVENTION

An robot operation device has been known in which an operator applies force to manipulate the robot in order to operate a robot by lead-through control (See Japanese Unexamined Patent Application, Publication No. 2019-34412, for example).

This robot operation device includes handles attached to a distal end portion of an arm portion of the robot via a force sensor, the force sensor detects force applied to the handles, and the robot is operated according to magnitude and a direction of the detected force. The handles are arranged with a space with respect to the central axis with each other, and the handles are arranged along parallel surfaces.

SUMMARY OF THE INVENTION

A first aspect of the present disclosure is an robot operation device attached to a robot having a long tool fixed to a flange provided at a distal end of the robot, the robot operation device including: a handle having an inner hole through which the tool is inserted, the handle configured to be held by one of hands of an operator in a manner that a longitudinal axis of the tool is enclosed by the one of the hands; and a sensor configured to attach the handle to the flange, the sensor detecting force or moment applied to the handle by the operator, wherein the robot is operable by lead-through control which changes a position and posture of the robot in response to the force or the moment detected by the sensor.

DESCRIPTION OF EMBODIMENT(S) OF THE INVENTION

When an operator uses handles to arrange a distal end of a long tool, such as a hand, welding torch, and the like, which is placed along a central axis of the flange by lead-through control, the operator hardly feels a sense of intuitively operating the tool. That is to say, the operator who is holding the handles operates the tool feeling that he/she is remotely operating the tool, accordingly, arranging the distal end of the tool at a desired positon at a desired angle in a precise manner requires a certain degree of skill. For that reason, it is desired to operate the robot by lead-through control in the sense of directly manipulating the long tool which is fixed to the flange.

A robot operation device 1 and a robot 100 according to an embodiment of the present disclosure will be described below with reference to the accompanying drawings.

Figure 1:
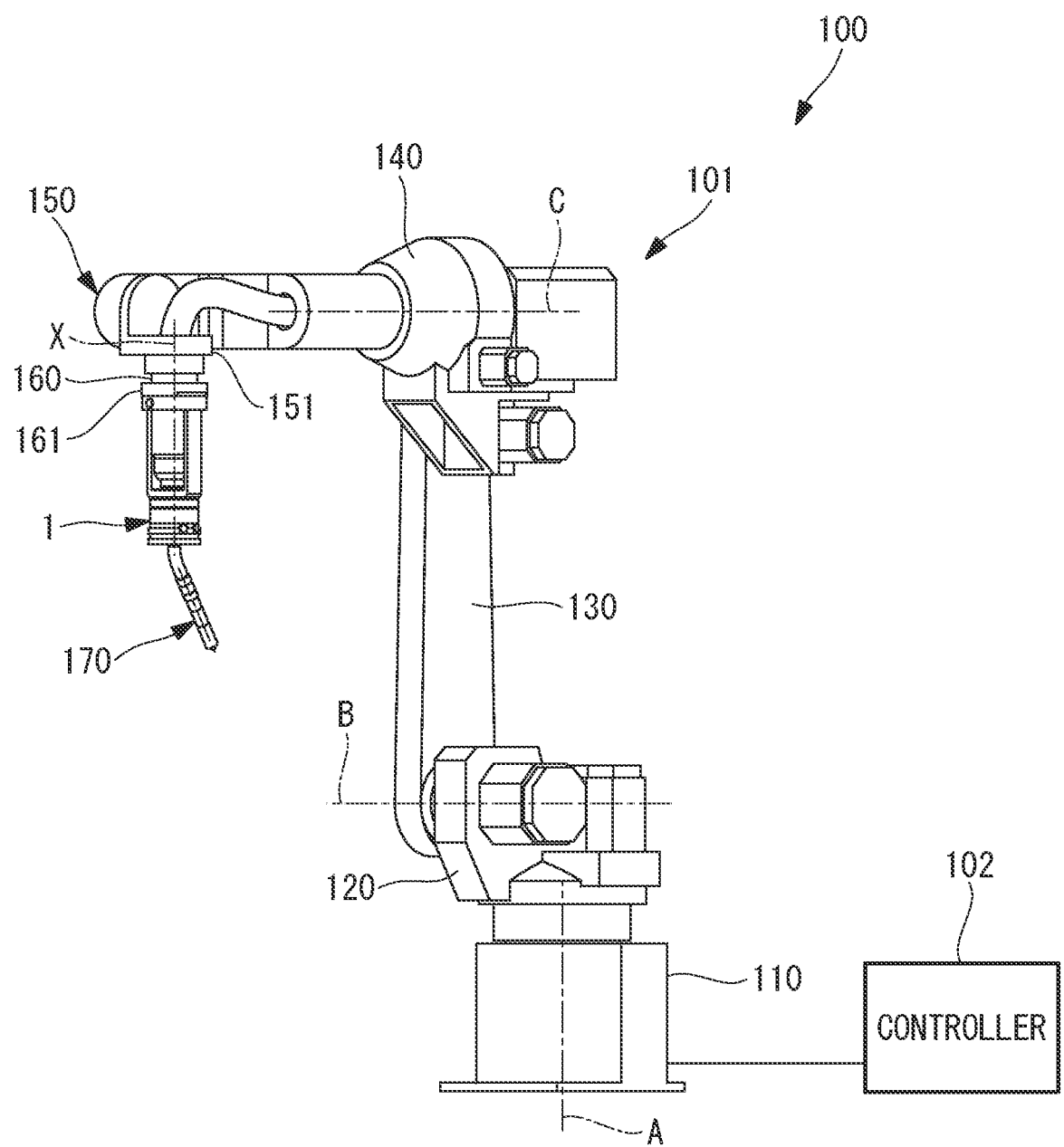
FIG. 1 is a perspective view of a robot according to an embodiment of the present disclosure.

As shown in FIG. 1, the robot 100 according to this embodiment includes a robot main body (a robot) 101 and a robot operation device 1 which is attached to the robot main body 101. The robot main body 101 is connected to a controller 102 which controls the robot main body 101.

As show in FIG. 1, for example, the robot main body 101 is a six-axis vertical articulated robot having a base 110 which is installed on an installation surface such as a floor and the like, and a turning drum 120 which is rotatably supported with respect to the base 110 around the first axis line A.

Also, the robot main body 101 has a first arm 130 which is rotatably supported by the turning drum 120 around a second axis line B and a second arm 140 which is rotatably supported by the first arm 130 around a third axis line C. Further, the robot main body 101 has a three-axis wrist unit 150 which is supported at a distal end of the second arm 140.

Figure 2:
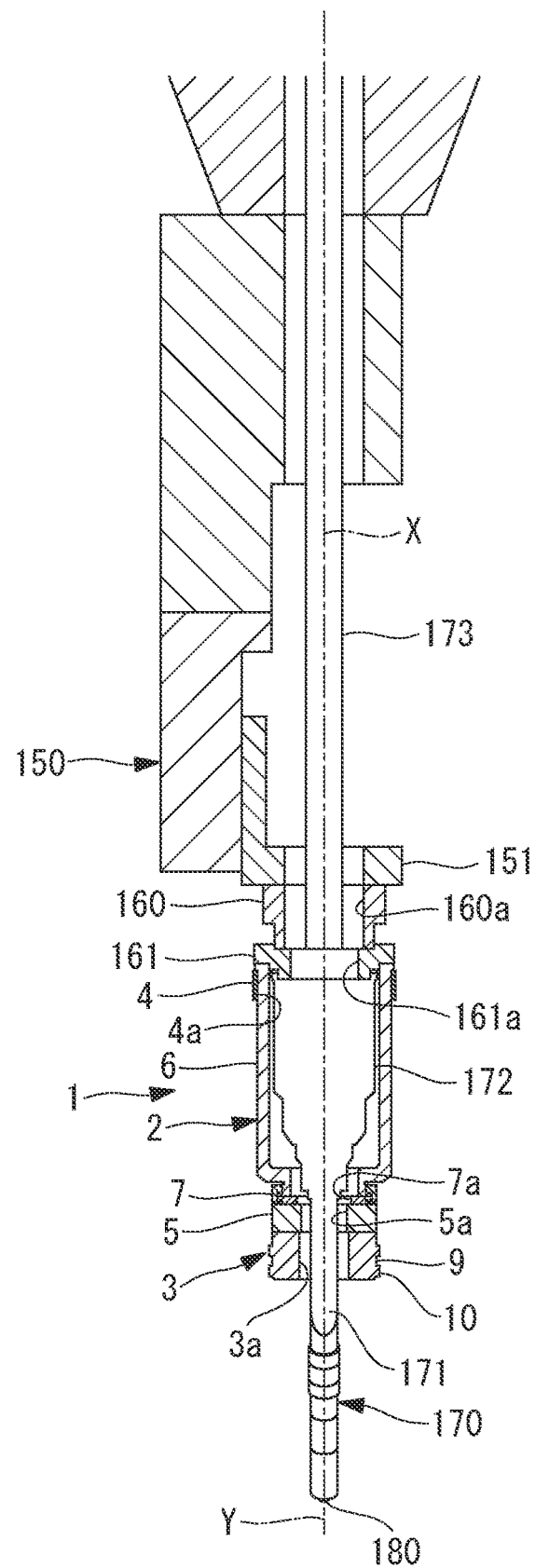
FIG. 2 is a front view with a partially broken section which shows a part of the robot of FIG. 1 having an robot operation device according to the embodiment of the present disclosure.
Figure 3:
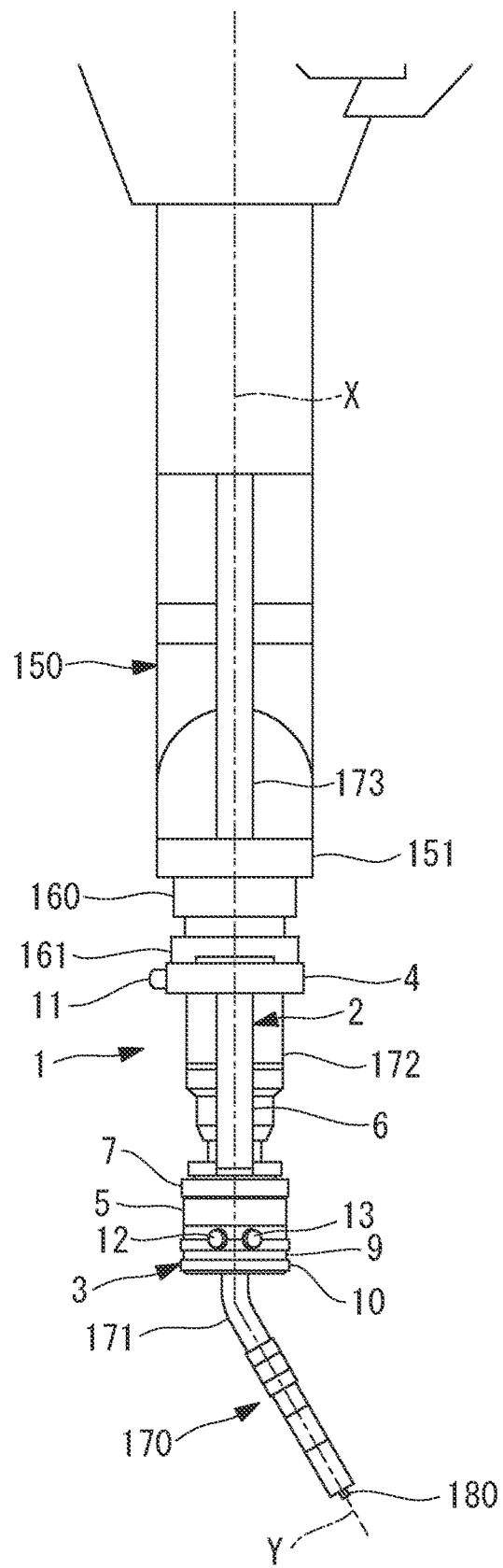
FIG. 3 is a side view showing the robot operation device of FIG. 1.

As shown in FIGS. 2 and 3, the wrist unit 150 has a flange 160 which is rotatable around a rotation axis line (a six axis) X located at the most distal end. The robot main body 101 has a hollow wrist element 151 located at the most distal end, and a flange 160 is also formed in an annular shape having an inner hole 160a. Note that a mechanism or the like which rotates the flange 160 around the rotation axis line X is not shown in the figures.

The controller 102 controls the robot main body 101 according to a taught operation program. Also, when lead-through control is instructed, the controller 102 is capable of changing a position and posture of the robot main body 101 according to magnitude and a direction of force or moment detected by a sensor 5, which will be described below.

An annular-shaped adapter 161 having an inner hole 161a is fixed to the flange 160 of the robot main body 101. The adopter 161 is a joint member for attaching a tool and a later described bracket 2 to the flange 160.

Figure 4:
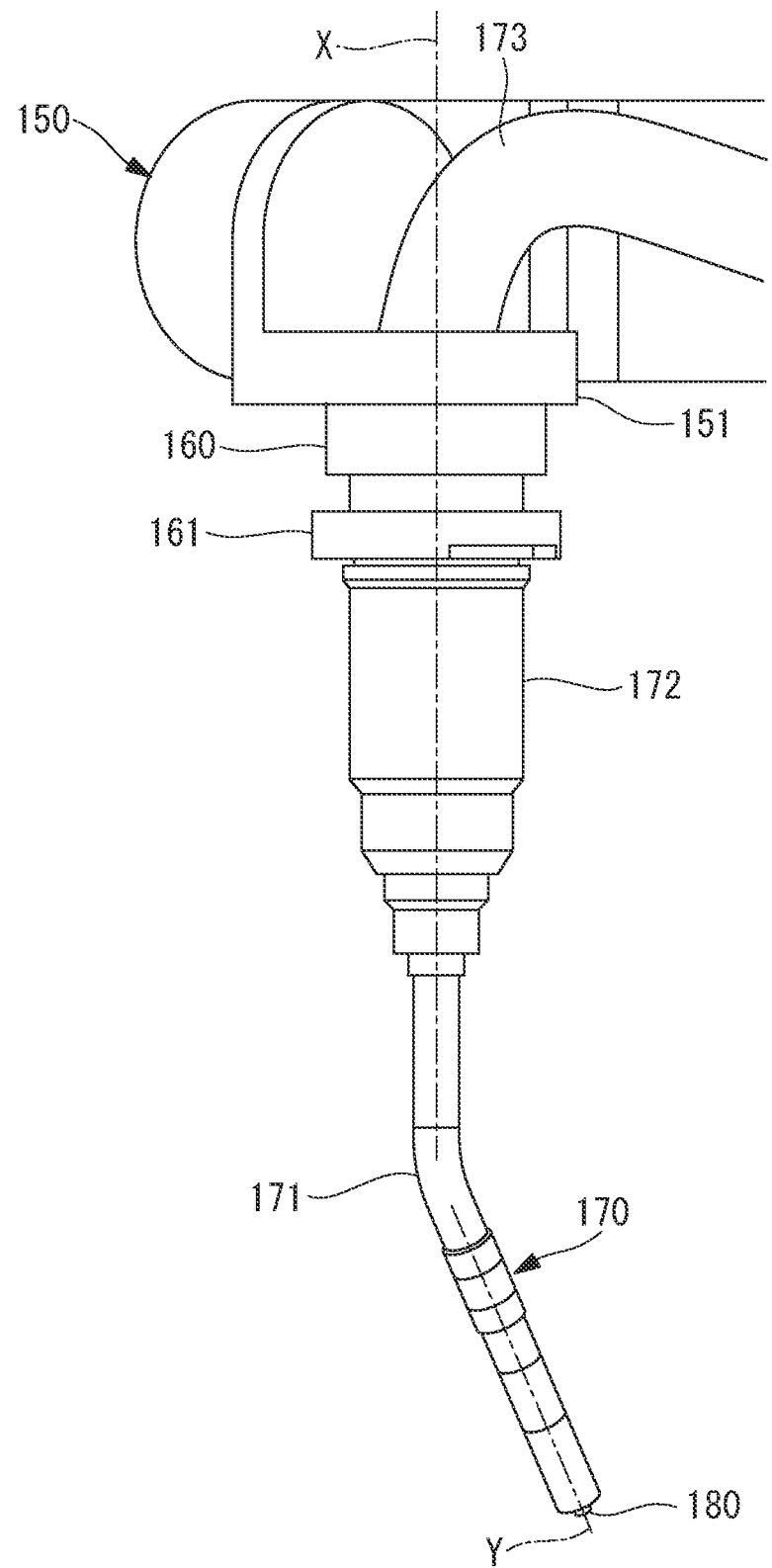
FIG. 4 is a perspective view of a part showing a state where a welding torch is attached to a flange of a robot main body of FIG. 1 by means of an adapter.

As shown in FIG. 4, the tool is a long tool such as a welding torch 170, and the tool is fixed to the flange 160 by means of the adapter 161.

The welding torch 170 has a torch main body 171 which is in a tubular shape and which is curved in one direction at an intermediate position in the length direction, a neck holder 172 which is in a substantially columnar shape and which is connected to a proximal end of the torch main body 171, and a guide tube 173 connected to a proximal end of the neck holder 172. The neck holder 172 has an outer diameter larger than the torch main body 171.

The guide tube 173, the neck holder 172, and the torch main body 171 are provided with an inner hole (not shown) through which the welding wire 180 is penetrated in the length direction. With the welding torch 170, the welding wire 180 which penetrates through the inner hole is projected from the distal end of the torch main body 171 so as to weld a workpiece by generating arc between the workpiece and the welding wire 180.

As shown in FIG. 2, with the welding torch 170 in this embodiment, the guide tube 173, which is connected to the proximal side of the neck holder 172, is inserted through the inner hole 161a of the adapter 161 and the inner hole 160a of the flange 160, and the proximal end side of the neck holder 172 is fixed to the adapter 161. By this, the torch main body 171 is arranged in a state where the longitudinal axis Y of the portion which is connected to the neck holder 172 is arranged at a position coaxial to the rotation axis line X of the flange 160.

As shown in FIGS. 2 and 3, the robot operation device 1 has a bracket 2 which is removably attached to the flange 160 by means of the adapter 161, a first handle (a handle) 3 which is removably attached to the bracket 2, a second handle 4, and a sensor 5.

The bracket 2 has two leg portions 6 extend parallel to the rotation axis line X at positions sandwiching the neck holder 172 there between in the radial direction. The proximal ends of the leg portions 6 are removably attached to the adapter 161, and the distal ends of the leg portions 6 are connected to each other by means of a first attachment portion 7. Also, a second attachment portion 8 is arranged at a position located in vicinity of the proximal ends of the leg portions 6.

Figure 5:
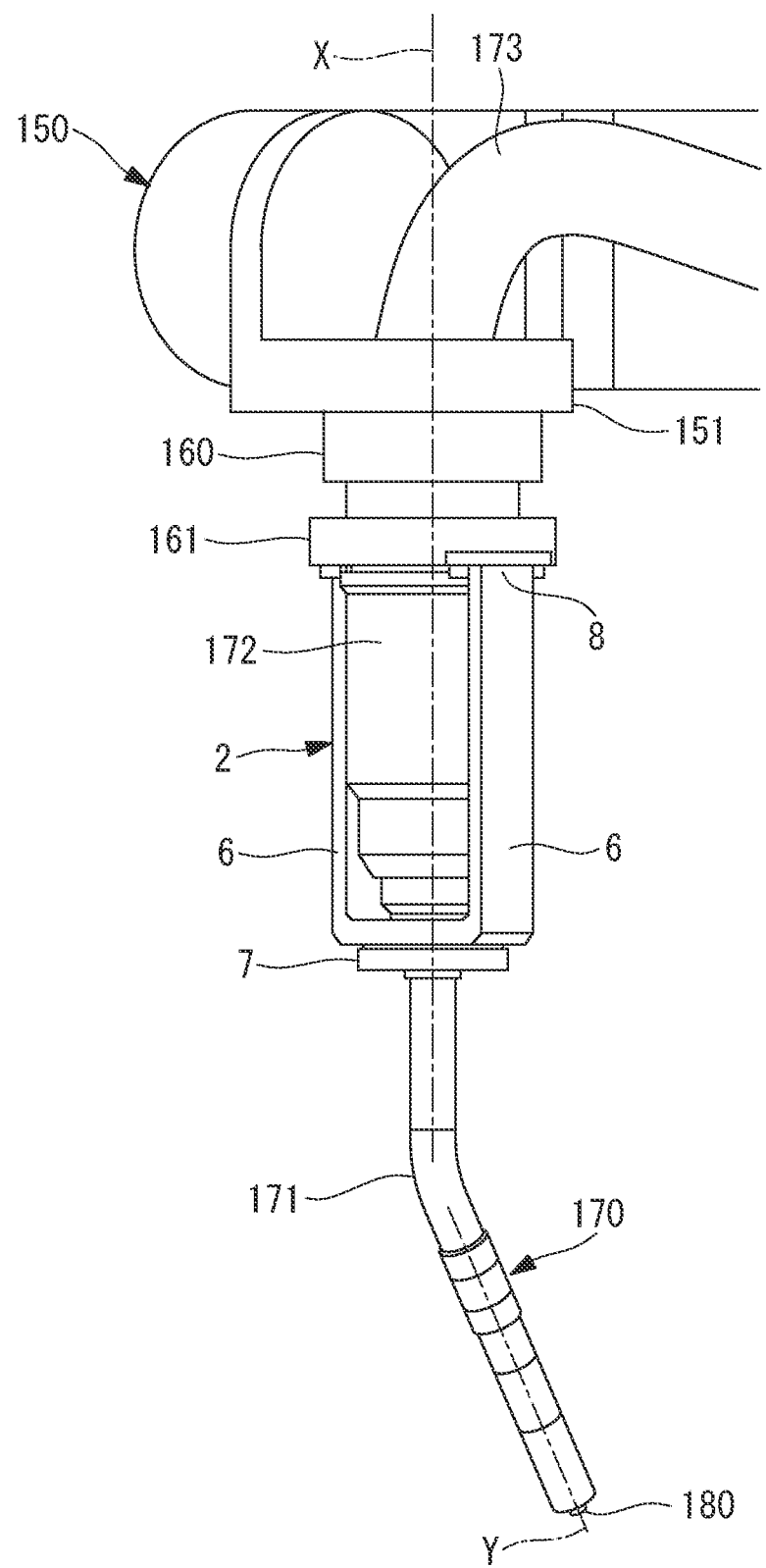
FIG. 5 is a perspective view of a part showing a state where a bracket is attached to the adapter of FIG. 4.

The first attachment portion 7 is formed in an annular shape having an inner hole 7a whose inner diameter is large enough to insert the distal end portion of the neck holder 172. The leg portions 6 has a length which is the same as or similar to the axis direction length of the neck holder 172, and as shown in FIG. 5, the first attachment portion 7 can be placed at a position close to the proximal end of the torch main body 171 by fixing the proximal ends of the leg portions 6 to the adapter 161. The second attachment portion 8 is a portion for fixing the second handle 4 to the proximal end of the bracket 2.

Figure 7:
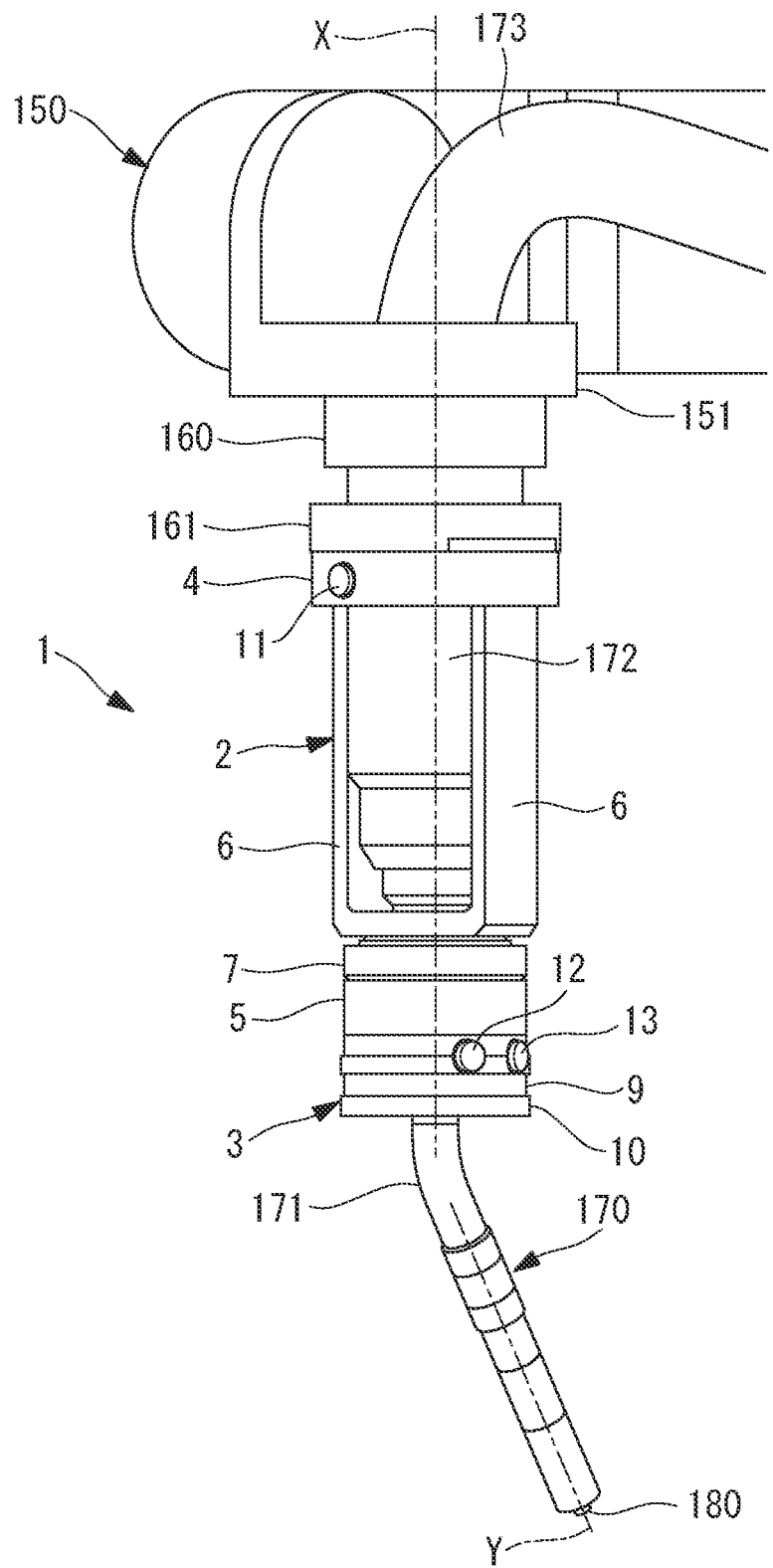
FIG. 7 is a perspective view of a part showing a state where a sensor and a first handle are attached to the bracket of FIG. 6.

The sensor 5 is a six-axis sensor capable of detecting force in the three-axis directions and moment around the three-axes which are orthogonal to each other, and, as shown in FIG. 2, the sensor 5 is formed in a annular shape having the inner hole 5a of a size capable of penetrating the torch main body 171 with a gap in a radial direction. The torch main body 171 is inserted into the inner hole 5a from the distal end side, and the sensor 5 is moved to the proximal end side of the torch main body 171 along a longitudinal axis Y so that one end of the sensor 5 in the axis direction is removably fixed to the first attachment portion 7 of the bracket 2 which is fixed to the flange 160, as shown in FIG. 7.

Also, as shown in FIG. 2, the first handle 3 is formed in a cylindrical shape having an inner hole 3a of a size capable of penetrating the torch main body 171 with a gap in the radial direction. The torch main body 171 is inserted into the inner hole 3a from the distal end side, and the first handle 3 is moved to the proximal end side of the torch main body 171 along the longitudinal axis Y so that the first handle 3 is removably fixed to the other end of the sensor 5 in the axis direction which is attached to the first attachment portion 7. By this, the first handle 3 is arranged at a position enclosing the torch main body 171 extending along the rotation axis line X of the flange 160.

Figure 8:
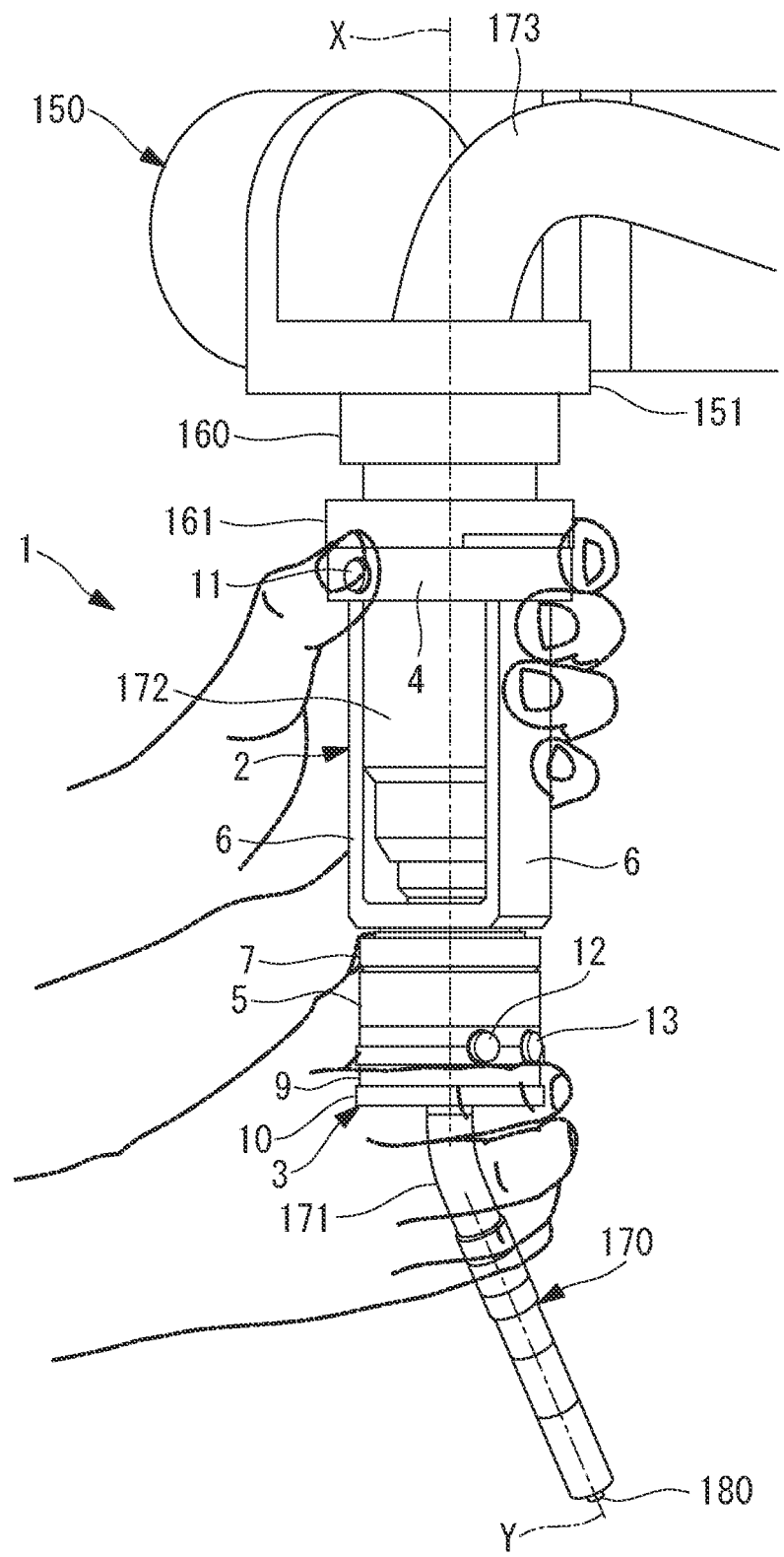
FIG. 8 is a perspective view of a part showing a state where an operator holds the first handle and the second handle of FIG. 7.

As shown in FIG. 8, the first handle 3 has such an outer diameter that an operator can apply force in different directions by holding the first handle 3 with one hand (the right hand in this embodiment) in a manner that the outer peripheral surface over a range wider than the semi-perimeter is enclosed by the hand. Unevenness that consists of a groove 9 and protrusions 10 for putting a finger of the hand holding the first handle 3 is formed over the entire periphery of the outer peripheral surface of the first handle 3 in the circumferential direction. Also, the outer peripheral surface of the first handle 3 is provided with two push button switches (operation switches) 12, 13 at positions operable by the point finger or the thumb of the hand holding the first handle 3.

One of the push button switches 12 is a teaching button (an operation switch, a position teaching switch), and when pushed, the push button switch 12 is for storing angles of axes of the robot main body 101 at the time when the push button switch 12 is pushed. Also, the other one of the push button switches 13 is a mode switching button (an operation switch, an operation mode changing switch), and the operation mode of the robot main body 101 is changed between orthogonal motion and each axis motion every time the push button switch 13 is pushed.

Figure 6:
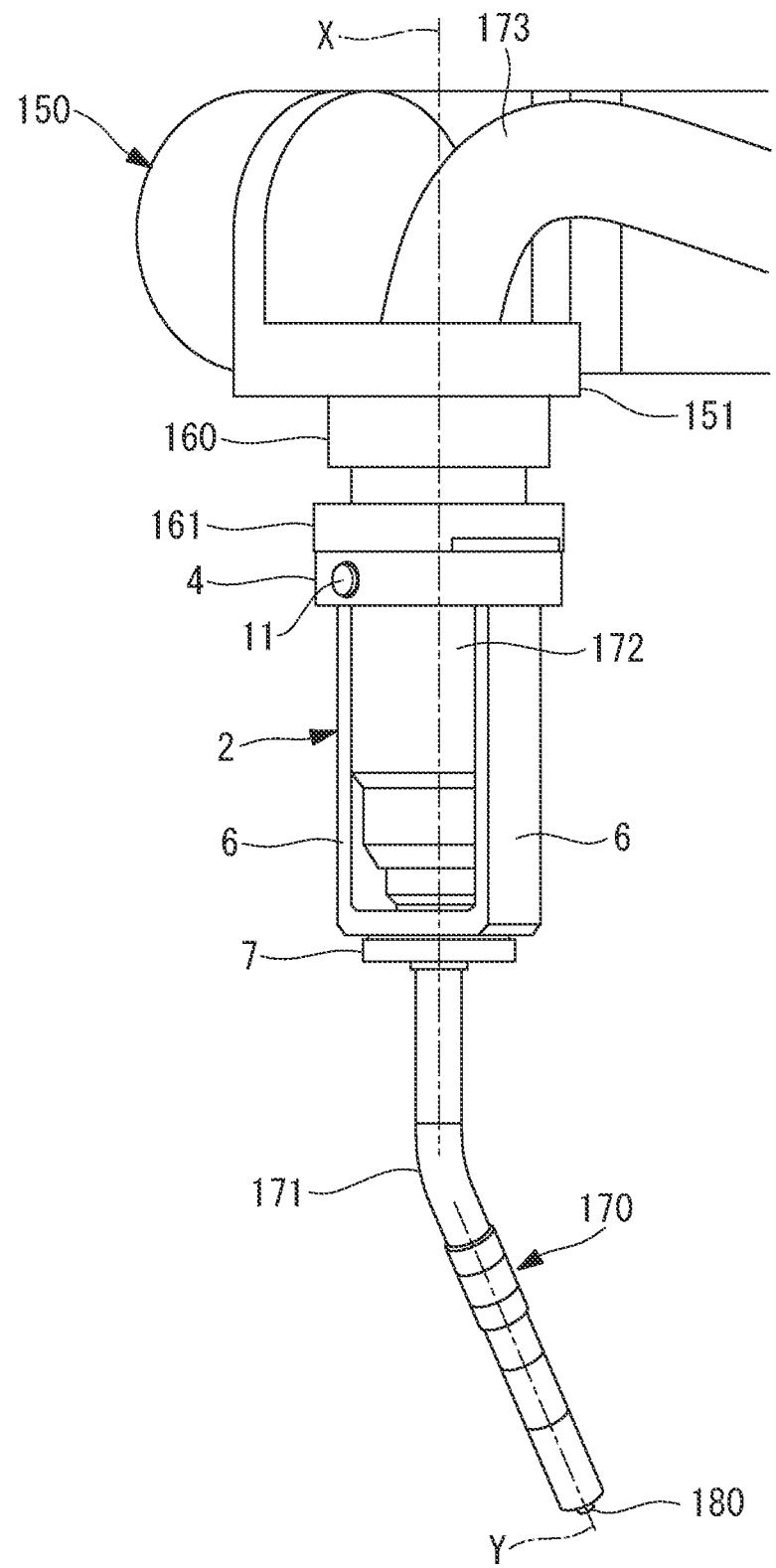
FIG. 6 is a perspective view of a part showing a state where a second handle is attached to the bracket of FIG. 5.

The second handle 4 is formed in a annular shape having an inner hole 4a of an inner diameter capable of inserting the bracket 2 and the neck holder 172. The torch main body 171 is inserted into the inner hole 4a from the distal end side, and the second handle 4 is removably fixed to the second attachment portion 8 of the bracket 2 at a position where the second handle 4 is moved to the proximal end side of the bracket 2 along the longitudinal axis Y, as shown in FIG. 6.

As shown in FIG. 8, the second handle 4 has an outer diameter capable of being held by the operator by the other one of the hands (the left hand in this embodiment) in a manner that the outer peripheral surface over a range wider than the semi-perimeter is enclosed by the hand.

The outer peripheral surface of the second handle 4 is provided with a lead-through switch 11 operable by the thumb of the hand holding the second handle 4.

The lead-through switch 11 is a push button switch which is connected to the controller 102 by means of a cable which is not shown. When the operator pushes the lead-through switch 11 with the hand holding the second handle 4, a lead-through control command is sent to the controller 102. The second handle 4 is fixed to the second attachment portion 8 at a rotational phase that the lead-through switch 11 is placed at a position in front of the operator who is located at the opposite side of the distal end of the torch main body 181 relative to the rotation axis line X of the flange 160.

The operation of the robot operation device 1 and the robot 100 according to the above described embodiment will be described below.

With the robot operation device 1 according to the present embodiment, in order to teach the robot main body 101 while performing the lead through control, the operator holds the first handle 3 with the right hand and the second handle 4 with the left hand. Further, the operator presses the lead-through switch 11 provided in the second handle 4 with a finger of the left hand holding the second handle 4.

The above described procedure enables the lead-through control. When the operator applies the force to the first handle 3 in this state, the sensor 5 detects the magnitude and direction of the applied force and moment, and the robot main body 10 is operated according to the detected force and moment.

And, in a state where the operator sets the operation mode by pressing the mode switching button 13 provided on the first handle 3, the robot main body 101 is operated by the lead-through control, and the operator pushes the teaching button 12 at a desired position. By this, the angle of each axis of the robot main body 101 and the operation mode which moves the robot main body 101 to the position are stored. It is possible to teach the operation program of the robot main body 101 by repeatedly preforming this operation.

In this case, the first handle 3 which is fixed to the flange 160 by means of the bracket 2 is formed in a cylindrical shape so that the first handle 3 is easily held by the operator, and the first handle 3 is arranged at a position coaxial to the longitudinal axis Y of the torch main body 171 at the proximal end of the torch main body 171. By this, the operator who holds the first handle 3 can apply the force to the first handle 3 with the same feeling as if the operator is holding the proximal end of the torch main body 171 and operate the robot 100 by lead through control.

As a result, it is easy for the operator to control the position and the posture of the torch main body 171 intuitively and to accurately place the distal end of the welding wire 180, which is arranged at the distal end point of the tool, at a desired position of the operator. Also, it is possible to supplementary use the left hand holding the second handle 4 when applying force to the right hand holding the first handle 3 so that the sensor 5 can detect various kinds of force and moment.

Also, since a space is provided between the inner hole 3a of the first handle 3 and the torch main body 171, even in a state where the torch main body 171 is overheated, the robot main body 101 can be operated by lead-through control which is performed with the first handle 3 being held by the operator. Also, since a space is also provided between the inner hole 5a of the sensor 5 and the torch main body 171, it is possible to prevent the heat of the torch main body 171 from being transmitted to the sensor 5 and also prevent the detection accuracy of the sensor 5 from being changed.

Moreover, since the unevenness 9 and 10 for putting the finger of the operator holding the first handle 3 is provided on the outer peripheral surface of the first handle 3, it is easy for the operator to apply the force to the first handle 3 and move the robot main body 101 to desired posture, which is advantageous.

Also, the first handle 3 and the second handle 4 does not largely protrude in the radial direction relative to the rotation axis line X of the flange 160 since the first handle 3 and the second handle 4 are arranged at positions coaxial to the neck holder 172 of the welding torch 170 and the torch main body 171 by means of the bracket 2. Accordingly, it has an advantage that it is possible to prevent the first handle 3 and the second handle 4 interfere with peripheral components, and the teaching can be performed easily.

The first handle 3, the second handle 4, and the sensor 5 are removably attached to the bracket 2, and therefore, by removing the first handle 3, the second handle 4, and the sensor 5 after teaching and before executing the operation program, it is possible to further reduce the interference with the peripheral components during the execution of the operation program. Also, removing the bracket 2 allows further reduction of the interference. In these cases, it is not required to remove the welding torch 170 from the flange 160, which is advantageous because taking time for the removing operation becomes unnecessary.

Also, since the first handle 3, the second handle 4, the sensor 5, and the bracket 2 are arranged at positions coaxial to the neck holder 172 and the torch main body 171, interference with the peripheral components is less likely to occur even if the first handle 3, the second handle 4, the sensor 5, and the bracket 2 are not removed from the robot main body 101.

Also, since the first handle 3 and the second handle 4 are arranged at the positions coaxial to the neck holder 172 of the welding torch 170 and the torch main body 171 by means of the bracket 2, there is an advantage that the first and the second handles 3 and 4 can be operated easily by simply changing the holding hands in any case where the operator is right-handed or left-handed.

Also, with the robot operation device 1 in accordance with the present embodiment, the sensor 5 for detecting the force and moment applied to the first handle 3 is provided between the first handle 3 and the bracket 2. By this, when the robot main body 101 is a wide-use robot and does not have the sensor 5, it is possible to conduct the teaching while performing the lead-through control on the robot main body 101, which is advantageous. And, after the teaching process is completed, the robot main body 101 can execute the taught operation program as the wide-use robot by removing the robot operation device 1.

Further, the teaching button 12 or the operation mode changing button 13 may function as the teaching button 12 or the operation mode changing button 13 by pressing the button for a short time, and by pressing the button for a long time, the teaching button 12 or the operation mode changing button 13 can function differently as a tool operation teaching switch and the like for teaching a tool operation command, for example.

Figure 9:
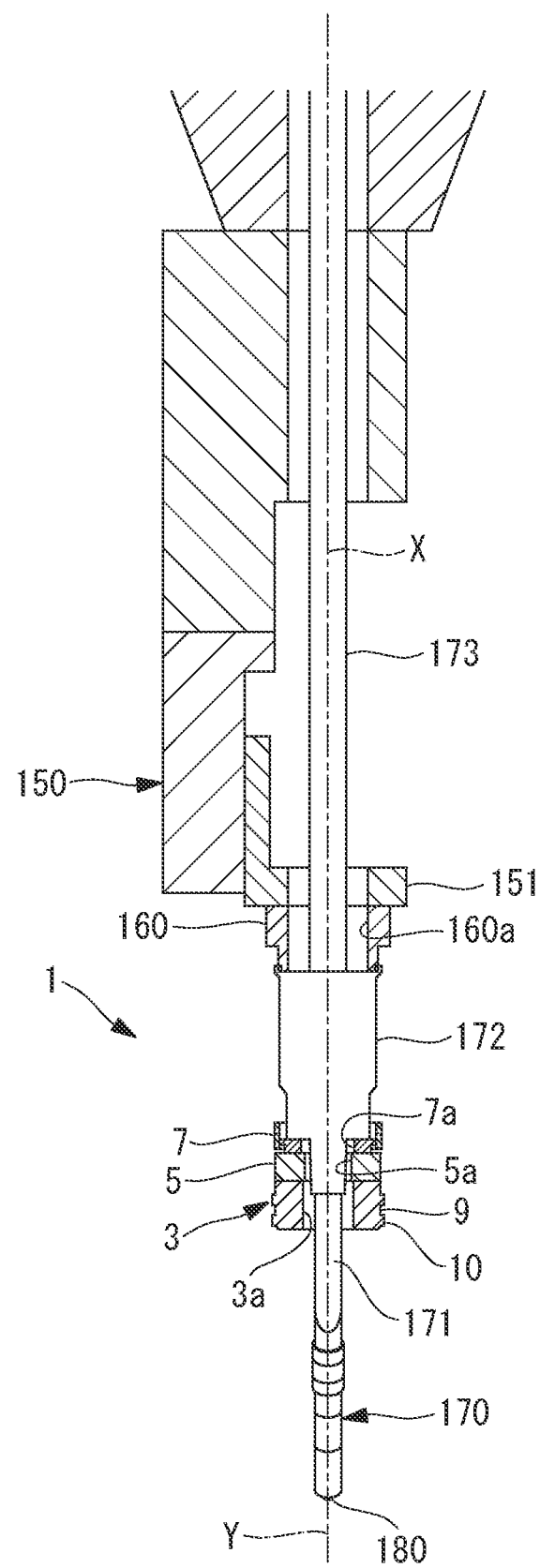
FIG. 9 is a front view with a partially broken section showing a modified example of the robot operation device of FIG. 2.
Figure 10:
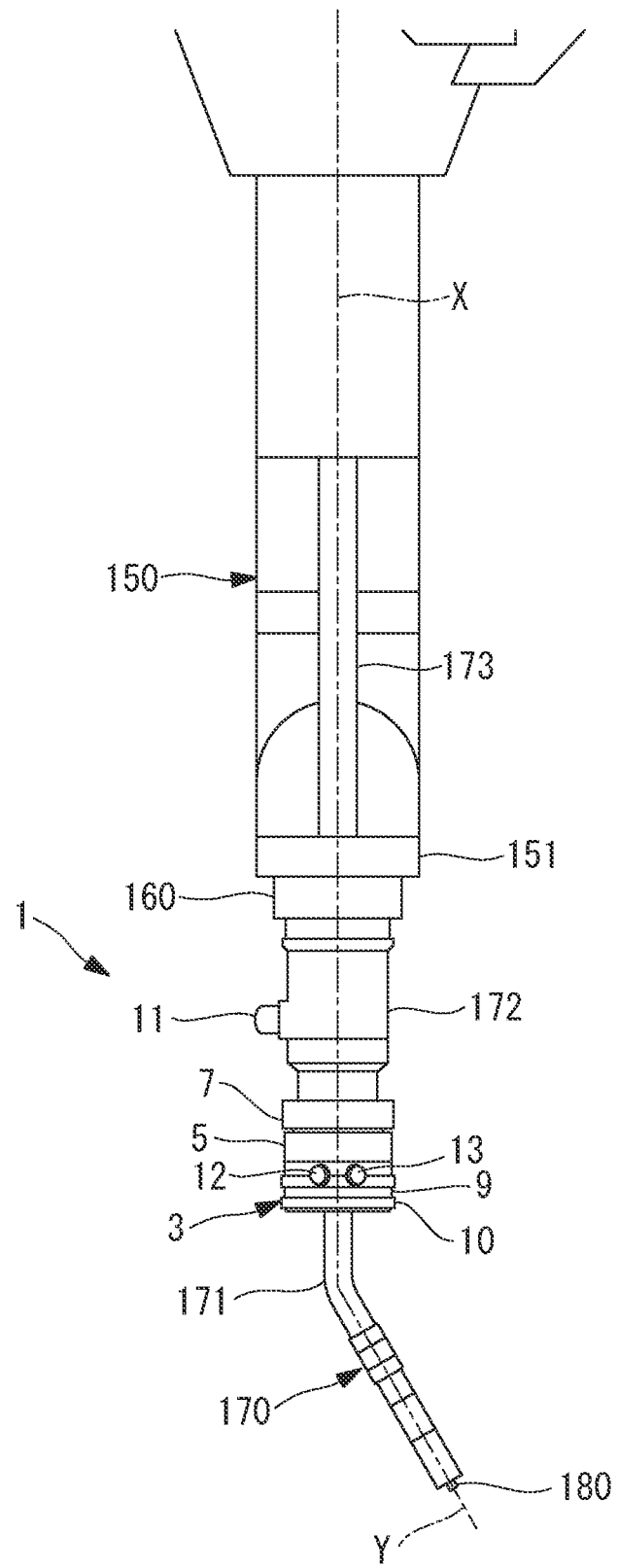
FIG. 10 is a side view showing the robot operation device of FIG. 9.

Moreover, in this embodiment, the sensor 5, the first handle 3, and the second handle 4 are removebly attached to the bracket 2 which is fixed to the flange 160 by means of the adapter 161 at the outside the welding torch 170. Alternatively, as shown in FIGS. 9 and 10, the neck holder 172 of the welding torch 170 may be used as the bracket 2, and the sensor 5 and the first handle 3 may be removably fixed to the flange 160 by means of the neck holder 172. Also, as shown in FIG. 10, the neck holder 172 itself may be provided as the second handle 4, and the lead-through switch 11 may be provided to the neck holder 172.

Also, as an example, this embodiment shows a case where the robot main body 101 has the hollow flange 160 and the welding torch 170 is arranged at a position coaxial to the rotation axis line X of the flange 160. Alternatively, as shown in FIG. 11, when the flange 160 does not have the inner hole 160a, it can be applied to a case where the welding torch 170 is supported at a position deviated from the rotation axis line X of the flange 160 by means of the bracket 2.

Figure 11:
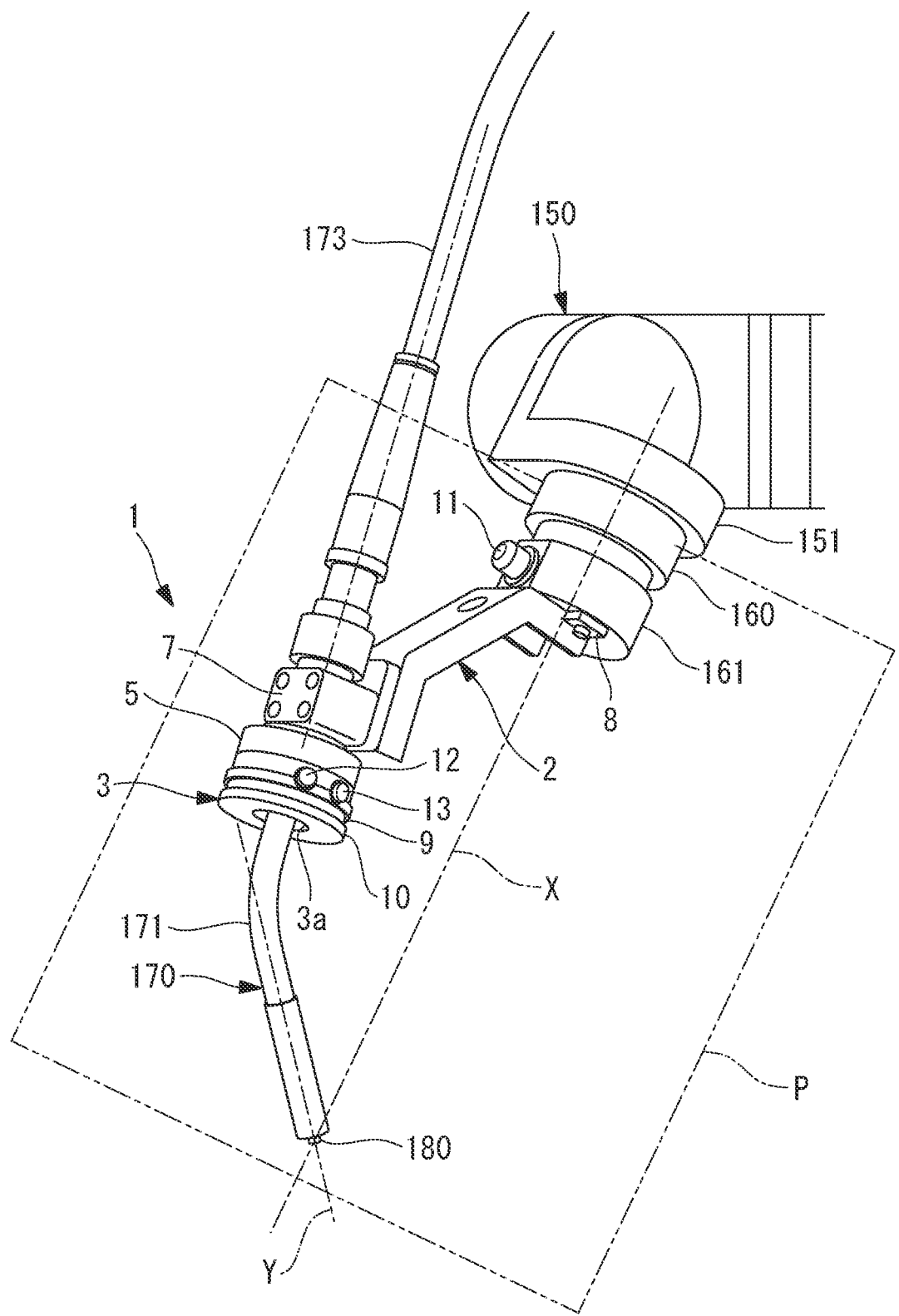
FIG. 11 is a perspective view showing another modified example of the robot operation device of FIG. 2.

In an example shown in FIG. 11, the torch main body 171 is curved, from the position fixed by the bracket 2, along a plan surface P including the rotation axis line X of the flange 160, and is arranged in such a manner that the welding wire 180 protrudes to a position orthogonal to the rotation axis line X of the flange 160. In general, an intersection point between the rotation axis line X of the flange 160 and the welding wire 180 is set as a distal end point of the tool.

In this case, the adapter 161 which fixes the bracket 2 to the flange 160 forms the second handle 4 having the lead-through switch 11, and the sensor 5 and the first handle 3 through which the torch main body 171 is inserted are fixed to the bracket 2. By this also, the first handle 3 is arranged at a position enclosing the longitudinal axis Y of the torch main body 171 so that the operator who holds the first handle 3 can feel the sense of directly holding the torch main body 171 when operating the robot main body 101 by the lead-through control. Also, after the teaching, it is possible to remove the first handle 3 and the sensor 5 from the bracket 2 without removing the torch main body 171.

Also, in this embodiment, the grooves 9 and the protrusions 10 for putting the finger of the hand holding the first handle 3 are provided on the entire periphery of the outer circumferential surface of the first handle 3, alternatively, the unevenness may be provided partially in the circumferential direction. Moreover, in this embodiment, the unevenness extends in the circumferential direction, however, the unevenness may extend in the axial direction, or both in the circumferential direction and the axial direction.

And, instead of the grooves 9 for putting fingers of the operator holding the first handle 3, a concave portion in a dimple shape or a convex portion in any form may be provided.

Further, the above embodiment describes the first handle 3 and the sensor 5 in the cylindrical shape or the annular shape having the inner holes 3a and 5a through which the tool is inserted as an example. Alternatively, as the first handle 3 and the sensor 5, a first handle and a sensor having a C-shaped cross section with a slit which is inserted from the outer peripheral surface to the inner holes 3a and 5a and which allows the tool to pass through in the radial direction may be adopted, for example.

Further, this embodiment shows the welding torch 170 as the tool which is fixed to the flange 160 as an example, however, instead of this, the tool may be any tools as long as it is a long tool. For example, a nozzle for laser welding or laser processing whose proximal end side is connected to an optical fiber cable for guiding a laser beam, and which emits a laser beam from the distal end thereof may be adopted, for example.

Also, a tool whose proximal end side is connected to a power cable, and which processes workpieces with a machining tool provided at the distal end may be adopted. Moreover, a nozzle whose proximal end side is connected to a fluid tube, and which emits fluid from the distal end thereof may be adopted.

Further, a hand which opens and closes fingers arranged at the distal end by using electrical power or pressurized fluid supplied from the power cable or the fluid tube connected at the proximal end side thereof may be adopted.

The invention claimed is:

1. A robot operation device attached to a robot having a long tool fixed to a flange provided at a distal end of the robot, wherein a longitudinal axis of a proximal end side of the tool extends along a rotation axis of the flange, the robot operation device comprising:
    a first handle having an inner hole through which the proximal end side of the tool penetrates along the longitudinal axis, the first handle configured to be held by one of hands of an operator in a manner that the longitudinal axis of the tool is enclosed by the one of the hands; and
    a sensor configured to attach the first handle to the flange so that the tool penetrates the inner hole along the longitudinal axis, the sensor detecting force or moment applied to the first handle by the operator,
    wherein the robot operation device is configured to use the force or the moment detected by the sensor to operate the robot so that the robot is operable by lead-through control which changes a position and posture of the robot in response to the force or the moment.

2. The robot operation device according to claim 1 further comprising a bracket which is fixed to the flange, wherein the sensor is fixed to the bracket.

3. The robot operation device according to claim 1 further comprising a lead-through switch disposed on a second handle attached in a vicinity of the flange so as to be operated by the other of the hands of the operator, the lead-through switch configured to be operated to enable and disable the lead-through control.

4. The robot operation device according to claim 1 wherein, the first handle is provided with at least one of operation switches of a position teaching switch and an operation mode changing switch, which are configured to be operated by the one of the hands of the operator in a state where the hand is holding the first handle.

5. The robot operation device according to claim 4, wherein at least one of the operation switches is changeable to a tool operation teaching switch for teaching a tool operation command by pressing the at least one of the operation switches for a long time.

6. The robot operation device according to claim 1, wherein the first handle is removable from the flange in a state where the tool is fixed to the flange.

7. The robot operation device according to claim 1, wherein the sensor is removable from the flange in a state where the tool is fixed to the flange.

8. The robot operation device according to claim 1, wherein an outer surface of the first handle is provided with unevenness for putting a finger of the one of the hands of the operator holding the first handle.

9. A robot comprising the robot operation device according to claim 1.

* * * * *